Jan. 15, 1963 A. W. HAYDON 3,073,107
FASTENING DEVICE
Filed April 2, 1958
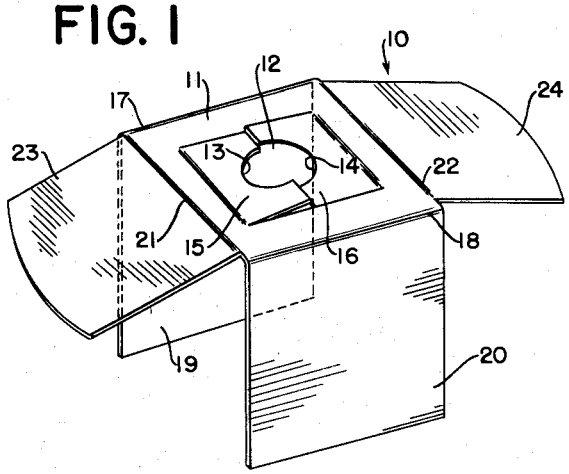
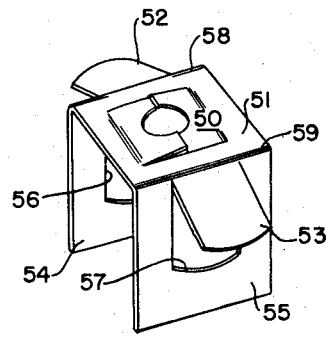
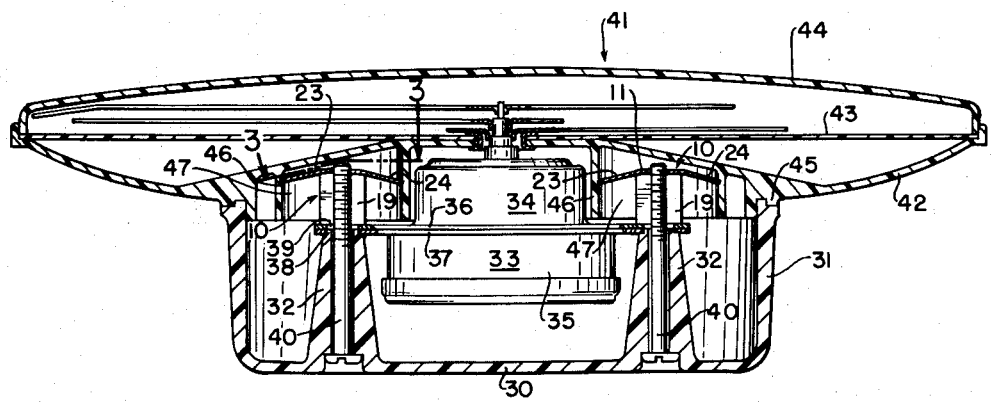
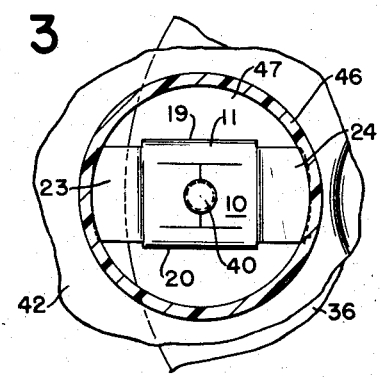
INVENTOR
ARTHUR W. HAYDON
BY
ATTORNEYS

United States Patent Office 3,073,107
Patented Jan. 15, 1963

3,073,107
FASTENING DEVICE
Arthur W. Haydon, Milford, Conn., assignor to Consolidated Electronics Industries Corp., Waterbury, Conn., a corporation of Delaware
Filed Apr. 2, 1958, Ser. No. 725,931
4 Claims. (Cl. 58—53)

The present invention relates to fastening devices, and more particularly to a novel and improved combination fastening device having means providing for the independent assembly of a plurality of parts to form a unitary structure.

In general, the invention relates to a fastening device, similar to a nut, which is adapted for cooperation with a bolt or the like, for fastening or mounting parts in a more or less conventional manner, and which includes additional means for fastening additional parts effectively independently of the fastening or mounting of the first named parts, but in a manner such that all the parts form a unified assembly. The arrangement is such that relatively complex assemblies may be fastened with a minimum of elements and operations and, in one advantageous application, an entire clock mechanism, including works and dial structure, may be assembled with two of the new fastening devices.

More specifically, the invention comprises a fastening device in the form of a sheet metal stamping of the general type set forth in the G. A. Tinnerman Patent No. 2,234,097, for example, which has a stamped opening adapted to coact with threads or with a stud post and which has pairs of arms extending in different directions and forming fastening means for different parts. One pair of arms is adapted to coact with the head of a bolt or stud, for gripping one or more parts, and the other pair of arms coacts with a part or parts engaged by the first arms to grip a second part or assembly of parts. The gripping of the second part is effectively independent of the gripping of the first part so that the assembly of parts may take place in a convenient and efficient sequence, and yet a multi-part assembly may be held together with a single fastening device.

While the new device has many uses, one of its most advantageous uses is in the assembly of clock mechanisms. Using a pair of the new fastening devices, the works of the clock may be assembled and secured in assembled relation, to the clock housing as if by conventional nuts and bolts. Subsequently, a dial or face assembly may be secured to the assembled works, by means of the same fastening devices, and without further manipulation thereof, to form a complete clock assembly. In the assembly, the fastening devices are covered by the dial parts, so as to be concealed when the clock face is viewed.

For a better understanding of the invention, reference should be made to the following detailed description and to the accompanying drawing, in which:

FIG. 1 is an enlarged, perspective view of a fastening device incorporating features of the invention;

FIG. 2 is a cross-sectional view of a clock assembly incorporating fastening devices of the type shown in FIG. 1;

FIG. 3 is an enlarged fragmentary, cross-sectional view taken generally on line 3—3 of FIG. 2; and FIG. 4 is an enlarged, perspective view of a modified form of the new fastening device.

Referring now to the drawing, and initially to FIG. 1 thereof, the new fastening device, designated generally by the numeral 10, is formed of spring-like sheet material and has a developed form in the shape of a cross. The central portion 11 of the cross, which is rectangular in the illustrated device, forms a body and is provided in its center with an opening 12 formed by semi-circular recesses 13, 14 in opposed spring sections 15, 16. The elements and features 12–16 are conventional, and form means for engaging a stud-like fastening element, such as a rod or bolt. Generally, the fastening element is a threaded bolt, in which event the spring sections 15, 16 are skewed to conform to the thread angle.

At two opposed edges 17, 18, which may be referred to as end edges, of the body 11, there are integral arm-like members 19, 20, disposed at right angles to the plane of the body and extending generally parallel to the axis of the opening 12, on opposite sides thereof. Advantageously, the arm-like members 19, 20 are bent-around portions of the sheet material forming the body, and the lower ends of the members 19, 20 form abutment means.

Extending from the opposite side edges 21, 22 of the body are arms 23, 24, which are integral with the body and extend generally radially outward from the axis of the opening 12. The arms 23, 24 are advantageously disposed at a slight angle (15°, for example) to the plane of the body 11, so that the arms extend somewhat downward, toward the abutment means formed by the lower ends of the arm-like members 19, 20. In the illustrated device, the outer ends of the arms 23, 24 are rounded, on a radius about the axis of the opening 12.

The novel function of the new device is best described by reference to FIGS. 2 and 3, illustrating an improved clock assembly. Referring first to FIG. 2, the clock assembly comprises a back casing member 30 having cylindrical walls 31 and a pair of spaced abutments 32. Mounted on the abutments 32 is a clock motor assembly 33, which may be a unitary assembly or may comprise separable parts 34, 35. The motor assembly, or the separable parts thereof, is provided with flanges 36, 37, which rest upon the abutments 32 and are located properly thereon by bosses 38 received in openings 39 in the flanges.

In the clock assembly of FIG. 2 the motor assembly 33 and casing member 30 are secured together by means of bolts 40, which extend through and project above the abutments 32. The upper ends of the bolts 40 are threaded and are engaged in the openings 12 of fastening devices 10 of the type illustrated in FIG. 1.

In accordance with the invention, the fastening devices 10 are oriented on the bolts 40 in such manner that the arm-like members 19, 20 engage the flange 36, holding the body 11 spaced above the flange. When the bolts 40 are tightened, the abutment means formed by the lower ends of the arm-like members 19, 20 press upon the flanges 36, 37 to secure the motor assembly 33 and casing member firmly together. And, as illustrated in FIG. 2, the body 11 and arms 23, 24 of each fastening device are spaced above the flanges 36, 37 a distance determined by the height of the arm-like members 19, 20.

Positioned on the walls 31 of the casing member 30 is an assembly 41 forming the remainder of the clock casing and comprising a dish-like casing part 42, mounting a dial or face 43, and a cover 44. In the illustrated arrangement, the dish-like casing part 42 has a circular flange 45 adapted to seat on the casing wall 31 and, in accordance with one aspect of the invention, the casing part 42 has means 46 forming spaced, downwardly opening recesses 47. Advantageously, the recess-forming means 46 comprise cylindrical walls, forming cylindrical recesses, and the axes of the recesses are spaced apart a distance equal to the spacing of the bolts 40. The diameter of the recesses 47 is slightly smaller than the span of the arms 23, 24 of the fastening device 10.

To assemble the casing assembly 41 with the motor-casing assembly 30, 33, the casing part 42 is arranged with the recesses 47 aligned over the fastening devices 10, and the casing part 42 is urged, with slight pressure, toward the casing part 30. The arms 23, 24 of the fastening devices 10, having sufficient resilience, deflect downward and inward, to permit the casing parts to be assembled, but, thereafter, the ends of the arms 23, 24 dig into the recess walls 46 to lock the fastening devices in the recesses. The cover assembly 41 is thus secured to the casing-motor assembly 30, 33 by the same fastening devices used, in a previous assembly operation, to form the casing-motor assembly.

The modified fastening device 50 of FIG. 4, which is also formed of spring-like sheet material, has a developed form in the shape of an elongated strip. The central portion 51 forms a body and the end portions are formed, in a manner to be described, into arms 52, 53 and arm-like members 54, 55.

In the modified device, the arms 52, 53 are tongue-like elements cut out of the material forming the arm-like members 54, 55. Thus, in forming the arm-like members, U-shaped cuts 56, 57 are formed in the ends of the blank, leaving U-shaped portions surrounding tongue-like portions, and the U-shaped portions are bent at right angles to the body 51, along its end edges 58, 59, to form the arm-like members 54, 55. The tongue portions form the arms 52, 53 and these may also be bent along the edges 58, 59 to lie at a small angle to the plane of the body 51.

The new fastening device is advantageous, in that it permits the assembly, in separate operations, of a plurality of parts, such as the several parts of sub-assemblies of a clock, for example. The fastening device is advantageously formed of spring-like sheet material and has portions which coact with a bolt or stud, in a manner similar to a conventional nut, and portions adapted to engage and secure a part in a manner effectively independent of the bolt or stud.

The new fastening device is advantageously incorporated in combination with a novel assembly, such as a clock, having a member provided with recesses for the reception of arms of the new fastening devices. And, advantageously, though not necessarily, the recesses are of circular form so that the fastening devices may be received therein regardless of rotational orientation. In the complete clock assembly, the new fastening devices engage three main parts of the clock. That is, the clockworks are engaged to the housing and a dial assembly is engaged to the works and housing, and the outer ends of the fastening devices, being received in recesses in the dial assembly, are entirely concealed from view. The improved clock assembly is also capable of convenient disassembly since the several parts may be quickly disengaged by removal of a small number (i.e., two) of fastening members.

It should be understood, however, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A combination clock assembly comprising a clock casing, a clock motor assembled with said casing, a stud projecting from said casing for a distance beyond said motor, a unitary fastening device of resilient sheet material having a flat body portion defining an opening for receiving said stud, thread means on said stud and on said body portion, abutment arms integral with said body portion disposed at a large angle to the plane thereof and having end edges opposite to their connection to said body portion forming abutment surfaces, said abutment arms being operative in cooperation with said stud to secure said casing and motor together, flat resilient arm members separate from said abutment arms and extending outwardly and integrally from said body portion and toward said abutment surfaces, and a casing assembly including a clock face, said assembly having means engaging one of the casing and motor and defining a recess therein for the reception of said arm members, said arm members resiliently engaging the sides of said recess to secure said casing assembly to the casing and motor.

2. A combination assembly comprising a first member, a second member assembled with said first member, a stud projecting from said first member for a distance beyond said second member, a fastening device having a body portion defining an opening for receiving said stud, interengaging thread means on said stud and on said body portion, abutment means integral with said body portion extending therefrom in a first direction and operative in cooperation with said stud to secure said first and second members together, arm means separate from said abutment means extending in a second direction from said body and integral therewith, a third member engaging one of the first and second members and having a recess for the reception of said arm means, said arm means engaging the sides of said recess to secure said third member to the other members, said first and second members comprising motor and casing parts for a clock assembly, and said third member comprising a second casing part for the assembly.

3. The combination of claim 2 characterized by said second casing part including dial mounting means.

4. A combination fastening device comprising a stud element, and a fastener formed of an elongated section of resilient sheet material having a central portion forming a generally flat body, means in said body for engaging and securing the stud element, end portions integral with said body and having first sections disposed at a large angle to the plane thereof and forming abutment arms, said end portions also having second sections forming arm members extending outward from said body and said abutment arms, said abutment arms being of generally U-shaped outline and having spaced leg portions joined to said body, said arm members being of the size and shape of the openings between the leg portions of the U-shaped abutment arms and being joined to said body between said leg portions.

References Cited in the file of this patent

UNITED STATES PATENTS

| | | |
|---|---|---|
| 1,832,359 | Carlson | Nov. 17, 1931 |
| 1,841,750 | Matthiessen | Jan. 19, 1932 |
| 2,283,122 | Murphy | May 12, 1942 |
| 2,382,521 | Tinnerman | Aug. 14, 1945 |
| 2,593,064 | Silberman | Apr. 15, 1952 |
| 2,654,620 | Tinnerman | Oct. 6, 1953 |
| 2,699,567 | Kramcsak | Jan. 18, 1955 |

FOREIGN PATENTS

| | | |
|---|---|---|
| 77,694 | Netherlands | Apr. 15, 1955 |